US011449612B2

(12) United States Patent
Kallos et al.

(10) Patent No.: US 11,449,612 B2
(45) Date of Patent: Sep. 20, 2022

(54) RANSOMWARE REMEDIATION

(71) Applicant: British Telecommunications Public Limited Company, London (GB)

(72) Inventors: George Kallos, London (GB); Fadi Ali El-Moussa, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/569,371

(22) Filed: Sep. 12, 2019

(65) Prior Publication Data

US 2020/0082084 A1 Mar. 12, 2020

(30) Foreign Application Priority Data

Sep. 12, 2018 (EP) .................................. 18193908

(51) Int. Cl.
*G06F 21/56* (2013.01)
*G06F 21/60* (2013.01)
*G06F 21/62* (2013.01)
*H04L 9/14* (2006.01)

(52) U.S. Cl.
CPC .......... *G06F 21/568* (2013.01); *G06F 21/561* (2013.01); *G06F 21/564* (2013.01); *G06F 21/566* (2013.01); *G06F 21/602* (2013.01); *G06F 21/6218* (2013.01)

(58) Field of Classification Search
CPC .... G06F 21/568; G06F 21/561; G06F 21/564; G06F 21/566; G06F 21/602; G06F 21/6218; G06F 21/56
See application file for complete search history.

(56) References Cited

U.S. PATENT DOCUMENTS

| 303,013 A | 8/1884 | Horton |
| 306,691 A | 10/1884 | Johnson |
| 315,727 A | 4/1885 | Church |
| 405,524 A | 6/1889 | Benton |
| 410,817 A | 9/1889 | Weeks, Jr. |
| 7,376,969 B1 | 5/2008 | Njemanze et al. |

(Continued)

FOREIGN PATENT DOCUMENTS

| CA | 2935130 A1 | 1/2018 |
| CN | 107273747 A | 10/2017 |

(Continued)

OTHER PUBLICATIONS

Berrueta, E., Morato, D., Magana, E., & Izal, M. (2019). A survey on detection techniques for cryptographic ransomware. IEEE Access, 7, 144925-144944. (Year: 2019).*

(Continued)

*Primary Examiner* — Alexander Lagor
(74) *Attorney, Agent, or Firm* — Patterson Thuente IP

(57) ABSTRACT

A computer implemented method for decrypting an encrypted data store at a target computer system, the data store being encrypted by a ransomware algorithm using a searchable encryption algorithm, the method including determining an encryption algorithm used by the ransomware algorithm; determining seed parameters used by the encryption algorithm to generate an encryption key; generating the encryption key using the seed parameters; and decrypting the encrypted data store.

8 Claims, 6 Drawing Sheets

(56) References Cited

U.S. PATENT DOCUMENTS

| | | |
|---|---|---|
| 7,503,071 B1 | 3/2009 | Hernacki |
| 7,716,739 B1 | 5/2010 | McCorkendale |
| 8,341,724 B1 | 12/2012 | Burns et al. |
| 8,584,241 B1 | 11/2013 | Jenks et al. |
| 8,898,788 B1 | 11/2014 | Aziz et al. |
| 8,953,584 B1 | 2/2015 | Wang |
| 9,009,825 B1 | 4/2015 | Chang et al. |
| 9,122,877 B2 | 9/2015 | Alperovitch et al. |
| 9,336,381 B1 | 5/2016 | Kane-Parry et al. |
| 9,547,588 B1 | 1/2017 | Biederman et al. |
| 9,807,106 B2 | 10/2017 | Daniel et al. |
| 9,818,136 B1 | 11/2017 | Hoffberg |
| 9,934,376 B1 | 4/2018 | Ismael |
| 10,050,982 B1 | 8/2018 | Guerra et al. |
| 10,546,143 B1 | 1/2020 | Wesson |
| 2002/0069318 A1 | 6/2002 | Chow et al. |
| 2002/0186875 A1 | 12/2002 | Burmer et al. |
| 2003/0084349 A1 | 5/2003 | Friedrichs et al. |
| 2003/0126464 A1 | 7/2003 | McDaniel et al. |
| 2004/0230834 A1 | 11/2004 | McCallam |
| 2005/0262562 A1 | 11/2005 | Gassoway |
| 2006/0161984 A1 | 7/2006 | Phillips et al. |
| 2006/0200253 A1 | 9/2006 | Hoffberg et al. |
| 2007/0240222 A1 | 10/2007 | Tuvell et al. |
| 2007/0244974 A1 | 10/2007 | Chasin |
| 2008/0294913 A1 | 11/2008 | Nakagoe et al. |
| 2008/0320595 A1 | 12/2008 | Van Der Made |
| 2009/0034423 A1 | 2/2009 | Coon et al. |
| 2009/0094618 A1 | 4/2009 | Huntsman |
| 2009/0187992 A1 | 7/2009 | Poston |
| 2010/0011029 A1 | 1/2010 | Niemela |
| 2010/0154032 A1 | 6/2010 | Ollmann |
| 2010/0186088 A1 | 7/2010 | Banerjee et al. |
| 2010/0262873 A1 | 10/2010 | Chang et al. |
| 2010/0281539 A1 | 11/2010 | Burns et al. |
| 2011/0023118 A1 | 1/2011 | Wright |
| 2011/0041179 A1 | 2/2011 | Staahlberg |
| 2011/0067106 A1 | 3/2011 | Evans et al. |
| 2011/0167491 A1 | 7/2011 | Ruggerio |
| 2011/0231935 A1 | 9/2011 | Gula et al. |
| 2012/0072983 A1 | 3/2012 | McCusker et al. |
| 2012/0082061 A1 | 4/2012 | Lysejko et al. |
| 2012/0082104 A1 | 4/2012 | Lysejko et al. |
| 2012/0210421 A1 | 8/2012 | Ormazabal et al. |
| 2012/0284794 A1 | 11/2012 | Trent et al. |
| 2012/0290829 A1 | 11/2012 | Altman |
| 2012/0331556 A1 | 12/2012 | Alperovitch et al. |
| 2013/0006949 A1 | 1/2013 | Essawi et al. |
| 2013/0073853 A1 | 3/2013 | Ford |
| 2013/0097699 A1 | 4/2013 | Balupari et al. |
| 2013/0262655 A1 | 10/2013 | Deschenes et al. |
| 2013/0326494 A1 | 12/2013 | Nunez |
| 2014/0157405 A1 | 6/2014 | Joll et al. |
| 2014/0164251 A1 | 6/2014 | Loh |
| 2014/0279757 A1 | 9/2014 | Shimanovsky et al. |
| 2014/0310394 A1 | 10/2014 | Wood et al. |
| 2014/0344931 A1 | 11/2014 | Edwards et al. |
| 2015/0052601 A1 | 2/2015 | White et al. |
| 2015/0089647 A1 | 3/2015 | Palumbo et al. |
| 2015/0120567 A1 | 4/2015 | Van et al. |
| 2015/0128263 A1 | 5/2015 | Raugas et al. |
| 2015/0149739 A1 | 5/2015 | Seo et al. |
| 2015/0304346 A1 | 10/2015 | Kim |
| 2015/0332283 A1 | 11/2015 | Witchey |
| 2015/0334125 A1 | 11/2015 | Bartos et al. |
| 2016/0070911 A1 | 3/2016 | Okereke et al. |
| 2016/0232351 A1 | 8/2016 | Guo et al. |
| 2016/0275288 A1 | 9/2016 | Sethumadhavan et al. |
| 2016/0299742 A1 | 10/2016 | Zheng |
| 2016/0328742 A1 | 11/2016 | Shiravi Khozani et al. |
| 2016/0366155 A1 | 12/2016 | El-Moussa et al. |
| 2017/0013000 A1 | 1/2017 | El-Moussa et al. |
| 2017/0034189 A1 | 2/2017 | Powell |
| 2017/0142133 A1 | 5/2017 | Kallos |
| 2017/0223032 A1 | 8/2017 | El-Moussa et al. |
| 2017/0250816 A1 | 8/2017 | Popa et al. |
| 2017/0289109 A1 | 10/2017 | Caragea |
| 2017/0337375 A1 | 11/2017 | Quinlan et al. |
| 2017/0360578 A1 | 12/2017 | Shin et al. |
| 2018/0025166 A1 | 1/2018 | Daniel et al. |
| 2018/0114020 A1 | 4/2018 | Hirschberg et al. |
| 2018/0114028 A1 | 4/2018 | Kafai et al. |
| 2018/0115566 A1 | 4/2018 | Azvine et al. |
| 2018/0115567 A1 | 4/2018 | El-Moussa et al. |
| 2018/0191751 A1 | 7/2018 | El-Moussa et al. |
| 2018/0212987 A1 | 7/2018 | Tamir et al. |
| 2018/0248896 A1 | 8/2018 | Challita et al. |
| 2018/0375882 A1 | 12/2018 | Kallos et al. |
| 2019/0012457 A1 | 1/2019 | El-Moussa et al. |
| 2019/0012459 A1 | 1/2019 | Choi et al. |
| 2019/0026466 A1 | 1/2019 | Krasser et al. |
| 2019/0068362 A1 | 2/2019 | Anderson et al. |
| 2019/0109869 A1* | 4/2019 | Bailey ................ H04L 63/1416 |
| 2019/0273510 A1 | 9/2019 | Elkind et al. |

FOREIGN PATENT DOCUMENTS

| | | |
|---|---|---|
| EP | 2741227 A1 | 6/2014 |
| EP | 2954453 A1 | 12/2015 |
| EP | 3346410 A1 | 7/2018 |
| JP | 2015106914 A | 6/2015 |
| JP | 5839967 B2 | 1/2016 |
| WO | WO-0184285 A2 | 11/2001 |
| WO | WO-02101516 A2 | 12/2002 |
| WO | WO-2008091785 A2 | 7/2008 |
| WO | WO-2008091785 A3 | 10/2008 |
| WO | WO-2009015422 A1 | 2/2009 |
| WO | WO-2009097610 A1 | 8/2009 |
| WO | WO-2012087685 A1 | 6/2012 |
| WO | WO-2013172750 A1 | 11/2013 |
| WO | WO-2015128609 A1 | 9/2015 |
| WO | WO-2015128612 A1 | 9/2015 |
| WO | WO-2015179020 A2 | 11/2015 |
| WO | WO-2016146610 A1 | 9/2016 |
| WO | WO-2017109135 A1 | 6/2017 |
| WO | WO-2018178027 | 10/2018 |
| WO | WO-2018178028 | 10/2018 |

OTHER PUBLICATIONS

Chen, Z. G., Kang, H. S., Yin, S. N., & Kim, S. R. (Sep. 2017). Automatic ransomware detection and analysis based on dynamic API calls flow graph. In Proceedings of the International Conference on Research in Adaptive and Convergent Systems (pp. 196-201). (Year: 2017).*

Continella, A., Guagnelli, A., Zingaro, G., De Pasquale, G., Barenghi, A., Zanero, S., & Maggi, F. (Dec. 2016). ShieldFS: a self-healing, ransomware-aware filesystem. In Proceedings of the 32nd Annual Conference on Computer Security Applications (pp. 336-347). (Year: 2016).*

Mehnaz, S., Mudgerikar, A., & Bertino, E. (Sep. 2018). Rwguard: A real-time detection system against cryptographic ransomware. In International Symposium on Research in Attacks, Intrusions, and Defenses (pp. 114-136). Springer, Cham. (Year: 2018).*

Sgandurra, D., Muñoz-Gonzalez, L., Mohsen, R., & Lupu, E. C. (2016). Automated dynamic analysis of ransomware: Benefits, limitations and use for detection. arXiv preprint arXiv:1609.03020. (Year: 2016).*

Shaukat, S. K., & Ribeiro, V. J. (Jan. 2018). RansomWall: A layered defense system against cryptographic ransomware attacks using machine learning. In 2018 10th International Conference on Communication Systems & Networks (COMSNETS) (pp. 356-363). IEEE. (Year: 2018).*

Vinayakumar, R., Soman, K. P., Velan, K. S., & Ganorkar, S. (Sep. 2017). Evaluating shallow and deep networks for ransomware detection and classification. In 2017 International Conference on Advances in Computing, Communications and Informatics (ICACCI) (pp. 259-265). IEEE. (Year: 2017).*

Goubault-Larrecq J., et al., "Detecting Subverted Cryptographic Protocols by Entropy Checking," Research Report LSV-06-13,

(56) References Cited

OTHER PUBLICATIONS

Retrieved from http://www.lsv.fr/Publis/RAPPORTS_LSV/PDF/rr-lsv-2006-13.pdf on Feb. 15, 2018, Jun. 2006, 21 pages.
International Preliminary Report on Patentability for Application No. PCT/EP2018/057675, dated Oct. 10, 2019, 8 pages.
International Preliminary Report on Patentability for Application No. PCT/EP2018/057676, dated Oct. 10, 2019, 8 pages.
International Search Report and Written Opinion for Application No. PCT/EP2018/057675, dated Apr. 26, 2018, 10 pages.
International Search Report and Written Opinion for Application No. PCT/EP2018/057676, dated May 29, 2018, 10 pages.
Zhang H., et al., "Detecting Encrypted Botnet Traffic," Computer Communications Workshops, Proceedings IEEE INFOCOM, 2013, 6 pages.
Application and File History for U.S. Appl. No. 16/568,874, filed Sep. 12, 2019, Inventor Kallos.
Application and File History for U.S. Appl. No. 16/569,043, filed Sep. 12, 2019, Inventor Kallos.
Application and Filing Receipt for U.S. Appl. No. 16/498,009, filed Sep. 26, 2019, Inventor El-Moussa.
Application and Filing Receipt for U.S. Appl. No. 16/498,029, filed Sep. 26, 2019, Inventor El-Moussa.
Cash D., et al., "Leakage-Abuse Attacks Against Searchable Encryption," CCS' 15, Oct. 12-16, 2015, 14 Pages.
Combined Search and Examination Report under Sections 17&18(3) for Application No. GB1814789.2, dated Mar. 5, 2019, 3 pages.
Eastlake D., et al., "Randomness Requirements for Security," Network Working Group, Jun. 2005, 32 pages.
Eastlake D., et al., "Randomness Requirements for Security," Network Working Group, Jun. 2005, 48 pages.
Extended European Search Report for Application No. 18193907.5, dated Jan. 7, 2019, 7 pages.
Extended European Search Report for Application No. 18193908.3, dated Jan. 9, 2019, 7 pages.
Extended European Search Report for Application No. 18193910.9, dated Jan. 3, 2019, 9 pages.
Extended European Search Report for Application No. 19196775.1, dated Oct. 15, 2019, 7 pages.
Extended European Search Report for Application No. 18193911.7, dated Jan. 4, 2019, 5 pages.
Extended European Search Report for Application No. 19196774.4, dated Oct. 15, 2019, 5 pages.
Extended European Search Report for Application No. 19196790.0, dated Oct. 15, 2019, 7 pages.
Genc Z. A., et al., "No Random, No Ransom: A Key to Stop Cryptographic Ransomware," Springer International Publishing, Jun. 8, 2018, vol. 10885, pp. 234-255.
International Search Report and Written Opinion for Application No. PCT/EP2019/074256, dated Oct. 8, 2019, 14 pages.
Kim H., et al., "Dynamic Ransomware Protection Using Deterministic Random Bit Generator," Information and Network Security, Nov. 13, 2017, 5 pages.
Kolodenker E., et al., "Pay Break : Defense Against Cryptographic Ransomware," 2017, pp. 599-611.
Search Report for Great Britain Application No. 1814787.6 dated Mar. 12, 2019, 4 pages.
Search Report for Great Britain Application No. 1814788.4 dated Mar. 12, 2019, 4 pages.
Sgandurra D., et al., "Automated Dynamic Analysis of Ransomware: Benefits, Limitations and Use for Detection," arXiv, 1609.03020.v1, Sep. 10, 2016, 12 pages.
Tseng A., et al., "Deep Learning for Ransomware Detection," Ieice Tech, Oct. 27, 2016, vol. 116 (282), 6 pages.
Yunling W., et al., "Secure Searchable Encryption: a Survey," A Journal of Communications and Information Networks, Dec. 2016, vol. 1 (4), pp. 52-65.
Bost R., et al. "Thwarting Leakage Abuse Attacks against Searchable Encryption—A Formal Approach and Applications to Database Padding," IACR Cryptol. ePrint Arch. 2017 (2017): 1060, 24 pages.
Wang G., et al., "Leakage Models and Inference Attacks on Searchable Encryption for CyberPhysical Social Systems," IEEE Access 6, 2018, pp. 21828-21839.
Yousefi-Azar M., et al., "Autoencoder-Based Feature Learning for Cyber Security Applications," 2017 International Joint Conference on Neural Networks (IJCNN), May 14, 2017, pp. 3854-3861.
"A Next-Generation Smart Contract and Decentralized Application Platform," Ethereum White Paper, 2016, retrieved from https://github.com/ethereum/wiki/wiki/White-Paper on Nov. 13, 2018, 40 pages.
Adler M., "Threat Intelligence Visibility- the way forward," BT, 2015, available from www.globalservices.bt.com/uk/en/products/assure threat_ monitoring, 8 pages.
Ahmad S., et al., "How do Neurons Operate on Sparse Distributed Representations? A Mathematical Theory of Sparsity, Neurons and Active Dendrites," Retrieved from https://arxiv.org/ftp/arxiv/papers/1601/1601.00720.pdf, 2018, 23 pages.
Ahmad S., et al., "Properties of Sparse Distributed Representations and their Application to Hierarchical Temporal Memory," retrieved from https://arxiv.org/ftp/arxiv/papers/1503/1503.07469.pdf on Mar. 28, 2018, Numenta, Mar. 24, 2015, 18 pages.
Ahmad S., et al., "Real-Time Anomaly Detection for Streaming Analytics," retrieved from https://arxiv.org/pdf/1607.02480.pdf on Mar. 28, 2018, Numenta, Inc., Jul. 8, 2016, 10 pages.
Anonymous, "Can BitCoin be a Better DRM? BitcoinBeginners," retrieved from https://www.reddit.com/r/BitcoinBeginners/comments/1y5yh8/can_bitcoin_be_a_better_drm/, Feb. 17, 2014, 3 pages.
Anonymous, "Colored Coins- Bitcoin Wiki," Retrieved from https://en.bitcoin.it/w/index.php?title=ColoredCoinsoldid=57259, Jul. 7, 2015, 6 pages.
Antonopoulos A.M., "Mastering Bitcoin, Unlocking Digital Crypto-Currencies," O'Reilly Media, Apr. 2014, 282 pages.
Asmi E.A.K., et al., "Bitcoin-Based Decentralized Carbon Emissions Trading Infrastructure Model," Systems Engineering, Mar. 2015, vol. 18 (2), Retrieved from the Internet: URL: https://www.researchgate.net/publication/268686553, 15 pages.
Assia Y., et al., "Colored Coins Whitepaper," 2015, available at https://docs.google.com/document/d/1AnkP_cVZTCMLIzw4DvsW6M8Q2JC0IIzrTLuoWu2z1BE/, 23 pages.
Benders J.F., "Partitioning Procedures for Solving Mixed Variables Programming Problems," 1962, vol. 4, pp. 238-252.
Bernaille L., et al., "Early Recognition of Encrypted Applications," Passive And Active Network Measurement, [Lecture Notes In Computer Science; LNCS], Springer Berlin Heidelberg, Berlin, Heidelberg, XP019078570, ISBN: 978-3-540-71616-7, Apr. 5, 2007, pp. 165-175.
Bestuzhev., "Steganography or Encryption in Bankers?," Nov. 10, 2011, retrieved on Feb. 15, 2018 at https://securelist.com/steganography-or-encryption-in-bankers-11/31650/, 3 pages.
Billaudelle S., et al., "Porting HTM Models to the Heidelberg Neuromorphic Computing Platform," Feb. 9, 2016, Cornell University Library, retrieved from https://arxiv.org/pdf/1505.02142.pdf, 9 pages.
Biryukov A., et al., "R&D in Smart Contracts, Cryptocurrency, and Blockchain," University of Luxembourg, Jan. 19, 2016, 51 pages.
Bluestein L.I., "A Linear Filtering Approach to the Computation of Discrete Fourier Transform," IEEE Transactions on Audio and Electro acoustics, vol. AU-18, No. 4, Dec. 1970, pp. 451-455.
Bonneau J., et al., "Research Perspectives and Challenges for Bitcoin and Cryptocurrencies," International Association for Cryptologic Research, Mar. 19, 2015, 18 pages.
Braden R., "Requirements for Internet Hosts-Communication Layers," Oct. 1989, Internet Protocol Suite RFC1122, Internet Engineering Task Force, https://tools.ietf.org/html/rfc1122, retrieved on Feb. 15, 2018, 116 pages.
Brunn G., "z-Transform DFT Filters and FFT's," IEEE Transactions on Acoustics Speech, and Signal Processing, vol. ASSP-26, No. 1, Feb. 1978, pp. 56-63.
Chaisiri, "Optimization of Resource Provisioning Cost in Cloud Computing," IEEE Transactions on Services Computing, Apr.-Jun. 2012, vol. 5 (2), 14 pages.

(56) References Cited

OTHER PUBLICATIONS

Chen Z., et al., "Spatial-Temporal Modeling of Malware Propagation in Networks," IEEE Transactions on Neural Networks, vol. 16, No. 5, Sep. 2005, pp. 1291-1303.
Communication pursuant to Article 94(3) EPC For European Application No. 18711987.0, dated Mar. 24, 2021, 5 pages.
Cruz J.P., et al., "The Bitcoin Network as Platform forTransOrganizational Attribute Authentication," WEB 2015, The Third International Conference on Building and Exploring Web Based Environments, XP055239598, Rome, Italy, 2015, 7 pages.
"CS294A/W Programming Assignment," Winter 2011, 5 pages.
Cui Y., et al., "Continuous Online Sequence Learning with an Unsupervised Neural Network Model," Neural Computation, vol. 28, No. 11, Nov. 2016, pp. 2474-2504.
Cui Y., et al., "The HTM Spatial Pooler: A Neocortical Algorithm for Online Sparse Distributed Coding," retrieved from https://www.biorxiv.org/content/biorxiv/early/2017/02/16/085035.full.pdf on Mar. 28, 2018, Numenta Inc., Feb. 3, 2017, 16 pages.
Czepluch U.S., et al., "The Use of Block Chain Technology in Different Application Domains," XP055242451, retrieved from http://www.lollike.org/bachelor.pdf, May 20, 2015, 109 pages.
Da Costa K.A.P., et al., "Malware Detection in Android-based Mobile Environments using Optimum-Path Forest," 2015, IEEE, 14th International Conference on Machine Learning and Applications, pp. 751-759.
Davis T., "Utilizing Entropy to Identify Undetected Malware," Product Manager, Cybersecurity Solutions, Guidance Software I Whitepaper, 2009, 11 pages.
Dobrushin, R.L., et al., "Encyclopedia of Mathematics," Entropy, Feb. 15, 2018, retrieved from https://www.encyclopediaofmath.org//index.php?title=Entropyoldid=15099, 2002, 2 pages.
Dobrushin R.L., et al., "Entropy," Encyclopedia of Mathematics, retrieved on Feb. 15, 2018 from http://www.encyclopediaofmath.org/index.php?title=Entropyoldid=15099, Springer, ISBN 1402006098, 2002, 2 pages.
Dorfinger P., et al., "Entropy Estimation for Real-Time Encrypted Traffic Identification," Springer Berlin Heidelberg, Berlin, Heidelberg, XP055127221, ISSN: 0302-9743 ISBN: 978-3-54-045234-8, DOI: 10.1007/978-3-642-20305-314, Apr. 27, 2011, vol. 6613, 8 pages.
"Service Name and Transport Protocol Port Number Registry" Feb. 15, 2018, available from www.iana.org/assignments/service-names-port-numbers/service-names-port-Nos.txt, retrieved on Mar. 6, 2018, 411 pages.
Extended European Search Report for Application No. 17163365.4, dated Oct. 6, 2017, 10 pages.
First.org, Inc., "Common Vulnerability Scoring System, V3 Development Update," available at www.first.org/cvss, CVSS v3.0 User Guide (v1.5), 15 pages, Released Jun. 2015 per archive management version at www.first.org/cvss.
Fischer A., et al., "An Introduction to Restricted Boltzmann Machines," Progress in Pattern Recognition, Image Analysis, Computer Vision and Applications, vol. 7441,2012, pp. 14-36.
Frigault M., "Measuring Network Security Using Bayesian Network-Based Attack Graphs," The Concordia Institute of Information systems Engineering, Mar. 2010, 88 pages.
Good I.J., "The Interaction Algorithm and Practical Fourier Analysis," Journal of the Royal Statistical Society, Series B (Methodological), 1958, vol. 20, No. 2, pp. 361-372.
Grushack J., et al., "Currency 3.0, Examining Digital Crypto Currency Markets," Union College, XP055242356, Retrieved from http://antipasto.union.edu/engineering/Archives/SeniorProjects/2014/CS.2014/files/grushacj/gru shacj_paper.pdf, Jun. 2014, 44 pages.
Haffner, et al., "ACAS: Automated Construction of Application Signatures," Proceeding of the 2005 ACM SIGCOMM Workshop on Mining Network Data, Minenet '05, New York, US, Aug. 22, 2005, 6 pages.
Hawkins J., et al., "Why Neurons Have Thousands of Synapses, A Theory of Sequence Memory in Neocortex," Frontiers in Neural Circuits, vol. 10, Article 23, Mar. 2016, 13 pages.
Hawkins J, "On Intelligence," How a New Understanding of the Brain Will Lead to the Creation of Truly Intelligent Machines, 2004, Times Books, Jul. 14, 2005, 174 pages.
Hinton G.E., et al., "A Fast Learning Algorithm for Deep Belief Nets," Neural Computation, 2006, 16 pages.
Hinton G.E., "To Recognize Shapes, First Learn to Generate Images," Oct. 26, 2006, 17 pages.
International Preliminary Report on Patentability for Application No. PCT/GB2015/051751, dated Dec. 20, 2016, 7 pages.
International Preliminary Report on Patentability for International Application No. PCT/EP2016/081187 dated Jun. 26, 2018, 6 pages.
International Preliminary Report on Patentability for International Application No. PCT/EP2016/081188 dated Jun. 26, 2018, 6 pages.
International Preliminary Report on Patentability for International Application No. PCT/EP2016/082488 dated Jun. 26, 2018, 6 pages.
International Search Report and Written Opinion for International Application No. PCT/EP2016/081187 dated Feb. 21, 2017, 8 pages.
International Search Report and Written Opinion for International Application No. PCT/EP2016/081188 dated Jan. 25, 2017, 8 pages.
International Search Report and Written Opinion for International Application No. PCT/EP2016/082488 dated Feb. 10, 2017, 9 pages.
International Preliminary Report on Patentability for Application No. PCT/EP2016/055506, dated Sep. 19, 2017, 6 pages.
International Preliminary Report on Patentability for Application No. PCT/EP2016/055507, dated Sep. 19, 2017, 8 pages.
International Preliminary Report on Patentability for Application No. PCT/GB2015/050431, dated Sep. 6, 2016, 9 pages.
International Preliminary Report on Patentability for Application No. PCT/GB2015/050444, dated Sep. 6, 2016, 10 pages.
International Preliminary Report on Patentability for Application No. PCT/GB2015/050446, dated Sep. 6, 2016, 10 pages.
International Search Report and Written Opinion for Application No. PCT/EP2016/055506, dated May 17, 2016, 9 pages.
International Search Report and Written Opinion for Application No. PCT/EP2016/055507, dated Jun. 2, 2016, 13 pages.
International Search Report and Written Opinion for Application No. PCT/GB2015/050431, dated May 26, 2015, 12 pages.
International Search Report and Written Opinion for Application No. PCT/GB2015/050444, dated May 29, 2015, 13 pages.
International Search Report and Written Opinion for Application No. PCT/GB2015/050446, dated May 26, 2015, 13 pages.
International Search Report and Written Opinion for Application No. PCT/GB2015/051751, dated Jul. 20, 2015, 9 pages.
International Telecommunication Union—ITU-T, "Telecommunication Standardization Sector of ITU, Series H.235.0 to H.235.7," Sep. 2005 and Jan. 2014, 296 pages.
International Telecommunication Union, "H.225/Q931 Amendment 1 (Dec. 2002) Series Q: Switching and Signaling Digital Subscriber Signaling System No. 1—Network Layer, ISDN User-Network Interface Layer 3 Specification for Basic Call Control, Amendment 1: Extensions for the support of digital multiplexing equipment," Printed Switzerland, Geneva, Dec. 2002, 26 pages.
ITU-T, H. 225.0, "Call Signalling Protocols and Media Stream Packetization for Packet-Based Multimedia Communication Systems," Series H: Audiovisual and Multimedia Systems Infrastructure of Audiovisual Services—Transmission Multiplexing and Synchronization, Dec. 2009, 196 pages.
ITU-T, H.225.0, "Call Signalling Protocols and Media Stream Packetization for Packet-Based Multimedia Communication Systems," Series H: Audiovisual and Multimedia Systems, Infrastructure of Audiovisual Services—Transmission Multiplexing and Synchronization, Amendment 1: Use of the Facility Message to Enable Call Transfer, Mar. 2013, 6 pages.
ITU-T H.235.0, "Series H: Audiovisual and Multimedia Systems Infrastructure of audiovisual services—Systems aspects," H.323 security: Framework for security in H-series (H.323 and other H.245-based) multimedia systems, Sep. 2005, 56 pages.
ITU-T H.235.0, "Series H: Audiovisual and Multimedia Systems Infrastructure of audiovisual services—Systems aspects," H.323 security: Framework for security in ITU-T H-series (Itu-T H.323 and other ITU-TH.245-based) multimedia systems, Jan. 2014, 64 pages.

(56) References Cited

OTHER PUBLICATIONS

ITU-T H.235.7, "Series H: Audiovisual and Multimedia Systems Infrastructure of audiovisual services—Systems aspects," H.323 security: Usage of the MIKEY key management protocol for the Secure Real Time Transport Protocol (SRTP) within H.235, Sep. 2005, 40 pages.
ITU-T, H.245, "Control Protocol for Multimedia Communication," Series H: Audiovisual and Multimedia Systems, Infrastructure of Audiovisual Services—Communication procedures, May 2011, 348 pages.
ITU-T H.323 Protocol Series H, "Audiovisual and Multimedia Systems," Infrastructure of Audiovisual Services Systems and Terminal Equipment for Audiovisual Services, Packet-Based Multimedia Communications Systems, The International Telecommunications Union (ITU), Dec. 14, 2009, 320 pages.
ITU-T H.323, "Series H: Audiovisual and Multimedia Systems," Infrastructure of Audiovisual Services Systems and Terminal Equipment for Audiovisual Services, Packet-Based Multimedia Communications Systems, Amendment 1: Use of Facility message to enable call transfer, Mar. 2013, 6 pages.
Krizhevsky A., et al., "Using Very Deep Autoencoders for Content-Based Image Retrieval," Proceedings of European Symposium on Artificial Neural Networks, Computational Intelligence and Machine Learning, 2011, pp. 489-494.
Lall A., et al., "Data Streaming Algorithms for Estimating Entropy of Network Traffic," SIGMETRICS/Performance 2006, Jun. 26-30, 2006, 12 pages.
Lavin A., et al., "Evaluating Real-Time Anomaly Detection Algorithms - The Numenta Anomaly Benchmark," Retrieved from https://arxiv.org/ftp/arxiv/papers/1510/1510.03336.pdf, Numenta, Inc., Oct. 9, 2015, 8 pages.
Leder F., et al., "Proactive Botnet Countermeasures, An Offensive Approach," Proc. of 1st CCDCOE Conference on Cyber Warfare, XP055129346, Tallinn, Estonia retrieved on Feb. 15, 2018, from http://www.ccdcoe.org/publications/virtualbattlefield/15_LEDER_Proactive_Coutnermeasures.pdf, Jun. 16, 2009, 15 pages.
Li G., et al., "Fractal-based Algorithm for Anomaly Pattern Discovery on Time Series Stream," Journal of Convergence Information Technology, vol. 6 (3), Mar. 31, 2011, pp. 181-187.
Lyda R., et al., "Using Entropy Analysis to Find Encryted and Packed Malware," Security & Privacy, IEEE, IEEE Service Center, Los Alamitos, CA, US, XP011175986, ISSN: 1540-7993 abstract p. 40, left hand column line 1—p. 44, right-hand col. line 39 p. 45, paragraph Related work, Mar. 2007, vol. 5 (2), pp. 40-45.
Miller A., "The State-of-the-Art of Smart Contracts," FinTech R&D Innovation Conference, Luxemburg, Jan. 19, 2016, 29 pages.
Munoz-Gonzalez, "Exact Inference Techniques for the Dynamic Analysis of Bayesian Attack Graphs," Imperial college, London, Oct. 2015, 14 pages.
Ng A., "Sparse autoencoder," CS294A Lecture notes, 2011, 19 pages.
Numenta, "Biological and Machine Intelligence (BAMI), A living book that documents Hierarchical Temporal Memory (HTM)," Mar. 8, 2017, 69 pages.
Numenta, "Hierarchical Temporal Memory including HTM Cortical Learning Algorithms," Version 0.2.1, Numenta, Sep. 12, 2011, 68 pages.
Numenta, "Sparse Distributed Representations," Numenta, retrieved from https://numenta.com/assets/pdf/biological-and-machine-intelligence/BaMISDR.pdfand accessed on Mar. 29, 2017, retrieved on Mar. 28, 2018, 15 pages.
Office Action For GB Application No. 1704943.8, dated Sep. 18, 2017, 5 pages.
Olshausen B.A., et al., "Sparse Coding with an Overcomplete Basis Set: A Strategy Employed by VI?," Pergamon, vol. 37, No. 23, 1997, pp. 3311-3325.
Plohmann D., et al., "Case study of the Miner Botnet," 4th International Conference on Cyber Conflict, Jun. 5, 2012, pp. 345-360.
Purdy S., "Encoding Data for HTM Systems," Retrieved from https://arxiv.org/ftp/arxiv/papers/1602/1602.05925.pdf, Numenta, Inc., Feb. 2016, 11 pages.
Radar C.M., "Discrete Fourier Transforms When the Number of Data Samples is Prime," Proceedings of the IEEE, Jun. 1968, pp. 1107-1108.
Ranzato M.A., et al., "Modeling Pixel Means and Covariances Using Factorized Third-Order Boltzmann Machines," 2010, 8 pages.
Rosenfeld M., "Overview of Colored Coins," https://bravenewcoin.com/assets/Whitepapers/Overview-of-Colored-Coins.pdf, Dec. 4, 2012, 13 pages.
Salakhutdinov R., et al., "Deep Boltzmann Machines," Proceedings of the 12th International Conference on Artificial Intelligence and Statistics (AISTATS), 2009, pp. 448-455.
"Service Name and Transport Protocol Port No. Registry," Last update on Oct. 6, 2017, 322 pages.
Shah S.Y., et al., "Price Based Routing for Event Driven Prioritized Traffic in Wireless Sensor Networks," Apr. 29-May 1, 2013, IEEE 2nd Network Science Workshop, XP032487185, 8 pages.
Shannon C.E., "A Mathematical Theory of Communication," The Bell System Technical Journal, Jul., Oct. 1948, vol. 27, 55 pages.
Sood A.K., et al., "An Empirical Study of HTTP-based Financial Botnets," IEEE Transactions on Dependable And Secure Computing, vol. 13 (2), Mar./Apr. 2016, pp. 236-251.
The Half-Baked Maker, "Machine Learning: Autoencoders," (/blog/5002), Jul. 16, 2012, retrieved from http://www.halfbakedmaker.org/blog/5002, 12 pages.
Traina C., et al., "Fast Feature Selection Using Fractal Dimension," XV Simposio Brasileiro de Banco de Dados, Joao Pessoa, Paraiba, Brasil, Anais, Oct. 2000, 16 pages.
Tschorsch F., et al., "Bitcoin and Beyond: A Technical Survey on Decentralized Digital Currencies," International Association for Cryptologic Research, May 15, 2015, pp. 1-37.
UFLDL, "Exercise: Sparse Autoencoder," retrieved from http://ufldl.stanford.edu/wiki/index.php/Exercise:Sparse_Autoencoder, last modified on Jul. 10, 2012, 5 pages.
UFLDL Tutorial, "Autoencoders," May 12, 2017, retrieved from http://ufldl.stanford.edu/tutorial/unsupervised/Autoencoders/, 5 pages.
Wang Z., "The Applications of Deep Learning on Traffic Identification," 2012, Advances in Neural Information Processing Systems, 2015, 10 pages.
"Who Will Protect Users From Ethereum Based Malware? : Ethereum," Mar. 28, 2016, Retrieved from https://www.reddit.eom/r/ethereum/comments/4ccfaa/who_will_protect_users_from_ethereum_based_malware/?st=itbp2q49sh=d8cc4355 on Nov. 13, 2018, 3 pages.
Wikipedia, "Blockchain (Database)—Wikipedia," Nov. 29, 2015, retrieved from https://en.wikipedia.org/w/index.php?title=Block_chain_(database)oldid=692921608, on Nov. 13, 2018, pp. 1-5.
Wood G., "Ethereum: A Secure Decentralised Generalized Transaction Ledger," EIP-150 Revision, Jun. 4, 2014, pp. 1-32.

* cited by examiner

RANSOMWARE REMEDIATION

CROSS-REFERENCE TO RELATED APPLICATION

The present application claims priority to EP Application No. 18193908.3 filed Sep. 12, 2018, which is hereby incorporated herein in its entirety by reference.

TECHNICAL FIELD

The present disclosure relates to the categorization of ransomware.

BACKGROUND

A ransomware attack involves an attacking computer system encrypting data stored at a vulnerable target computer system—such as whole disk encryption—so as to prevent users of the target system from accessing the data. Targets may be offered access to their data on receipt of a payment.

SUMMARY

Accordingly it would be beneficial to mitigate such attacks.

The present disclosure accordingly provides, in a first aspect, a computer implemented method for decrypting an encrypted data store at a target computer system, the data store being encrypted by a ransomware algorithm using a searchable encryption algorithm, the method comprising: determining an encryption algorithm used by the ransomware algorithm; determining seed parameters used by the encryption algorithm to generate an encryption key; generating the encryption key using the seed parameters; and decrypting the encrypted data sore, wherein the encryption algorithm is determined by training an autoencoder based on padding bytes used by the encryption algorithm to pad units of data encrypted by the ransomware, and using the trained autoencoder to process padding bytes for units of data encrypted by each of a plurality of known searchable encryption algorithms to identify one of the known encryption algorithms as the algorithm used by the ransomware; and wherein the seed parameters are determined based on monitoring application programming interface (API) calls made to an operating system of a computer system targeted by the ransomware to identify a set of API calls for retrieving data about one or more hardware components of the target computer system, the data about the hardware components being determined to constitute the seed parameters.

In some embodiments the autoencoder is trained by: exposing a training computer system to the ransomware algorithm to encrypting a data store of the training computer system using the searchable encryption algorithm; intercepting an ordered plurality of messages communicated from the training computer system to a ransomware server computer system, each message including a payload storing an encrypted unit of data from the target computer system; inspecting a final byte in the encrypted unit of data in each message to identify a byte value used by an encryption algorithm of the ransomware as the padding byte to pad messages to the size of an integral multiple of units of encryption for the encryption algorithm; training an autoencoder based on a position of a message in the ordered plurality of messages and the padding byte to provide a trained autoencoder adapted to differentiate the encryption algorithm used by the ransomware from other different encryption algorithms.

In some embodiments, using the trained autoencoder to process padding bytes for units of data encrypted by each of a plurality of known searchable encryption algorithms comprises: for each of the set of known searchable encryption algorithms: a) encrypting a sample data set; b) requesting and receiving an ordered plurality of elements of the encrypted data set using locations indicated in an index generated by the known encryption algorithm; c) inspecting a final byte of each element; and d) invoking the trained autoencoder based on a position of each element in the ordered plurality of elements and a final byte corresponding to each element so as to determine if the known searchable encryption algorithm matches the encryption algorithm used by the ransomware.

In some embodiments each hardware component includes one or more of: a central processing unit; a memory; a storage device; a peripheral device; a basic input/output subsystem; an output device; an input device; and a network device of the target computer system.

In some embodiments data about a hardware component includes one or more of: a reference number; an identifier; a version; a date; a time; an address; a serial number; and unique information about the hardware device.

In some embodiments monitoring includes using a process monitor to determine operating system API calls are made.

The present disclosure accordingly provides, in a second aspect, a computer system including a processor and memory storing computer program code for performing the method set out above.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which.

DETAILED DESCRIPTION

In a ransomware attack, an attacker may refrain from providing complete decryption in order to pursue an ongoing program of extortion by providing only partial access to the maliciously encrypted data. For example, a victim may be compelled to pay an agent of the attacker to access particular data such as data that only exists in the encrypted disk, data that is rare, data that is valuable, confidential data, personal data and the like. Additionally or alternatively, a ransomware attacker may seek to benefit from access to data at a target system by unauthorized data access, unauthorized data usage and/or data theft. For example, payment information such as credit card details, personal information such as name, address and other personal identification or other sensitive information may be stolen by an attacker. To achieve such targeted data theft, attackers identify such potentially valuable information within the data of a target system.

To these ends, attackers employ searchable encryption technologies (as are well known in the art) to selectively decrypt data stored on a victim system. Searchable encryption involves the generation of an index during the encryption process to categorize and identify parts of the encrypted data for subsequent selective decryption. For example, sensitive data, financial information, personal confidential information and the like may be selected for special indexing.

Different ransomware attacks will have different characteristics that must be taken into account to inform, inter alia, a nature, order and speed of defensive and responsive measures that may be taken in a physical or virtual computer system or network of such computer systems when ransomware is detected. For example, a rate of encryption, a nature and rate of propagation of malicious software employed by a ransomware attacker, a nature, extent and reliability of any paid-for decryption. Such characteristics, and others that will be apparent to those skilled in the art, may impact how an organization should react to a ransomware attack. Reactive measures can involve: determining an extent of isolation required for a network of connected systems within an organization (e.g. is the ransomware likely confined or widely spread at a point in time following detection?); determining an extent of spread of ransomware (e.g. are network appliances, peripherals and network storage implicated?); whether a remediation or mitigation mechanism is known; whether the attacker is cooperative; and others. Accordingly, it is beneficial to categorize ransomware to determine attributes for informing and selecting reactive measures.

Figure 1:
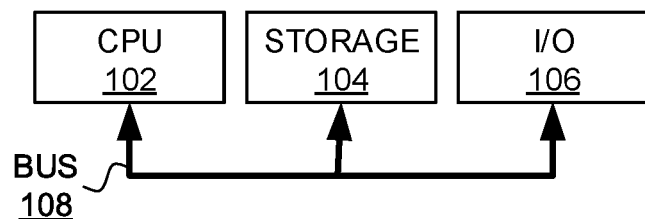
FIG. 1 is a block diagram a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
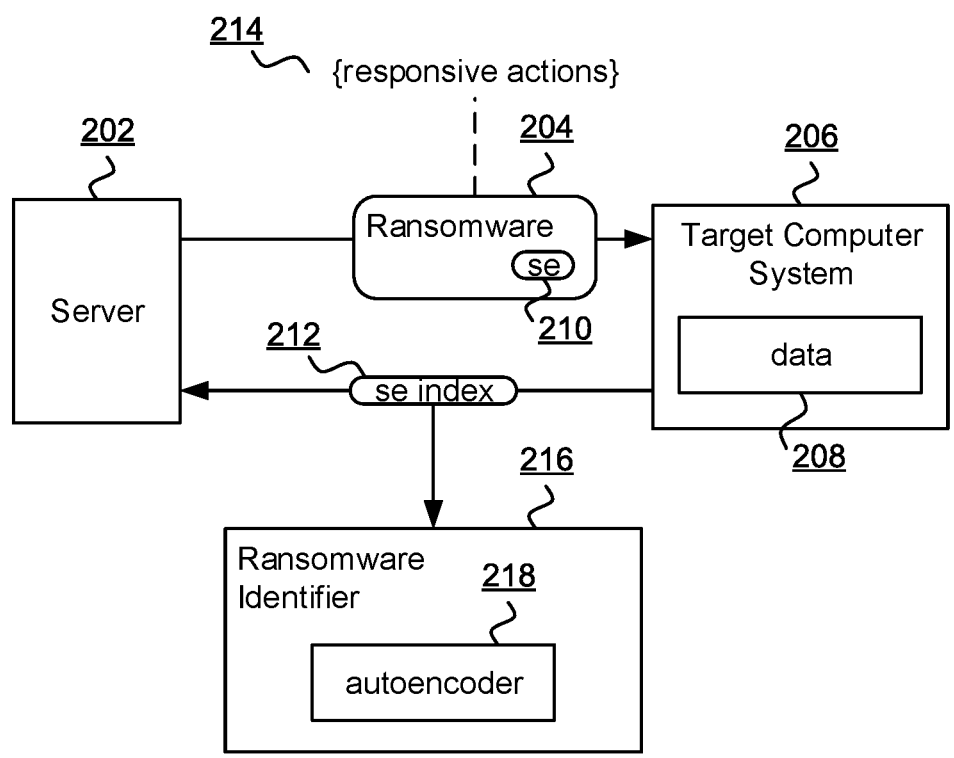
FIG. 2 is a component diagram of an arrangement including a ransomware identifier according to embodiments of the present disclosure.

FIG. 2 is a component diagram of an arrangement including a ransomware identifier 218 according to embodiments of the present disclosure. A server 202 is a computer system involved in delivering, triggering, prompting or serving a ransomware attack on a target computer system 206. For example, the ransomware attack can be effected by delivering malicious software (ransomware 204) to the target computer system 206 to encrypt data 208 stored at the target computer system 206. The ransomware 204 employs a searchable encryption (se) algorithm 210 to encrypt the data at the target computer system 206. In doing so, the encryption algorithm 210 generates a searchable encryption index 212 that is communicated to the server 202.

Embodiments of the present disclosure exploit the method of operation of ransomware and the mechanism of ransomware attacks to identify ransomware attacks undertaken using an identifiable ransomware algorithm such that responsive actions 214 known to be effective, appropriate, occasioned or otherwise warranted in response to a particular ransomware 204 can be effected. Thus, a ransomware identifier 216 component is a hardware, software, firmware or combination component communicatively connected to the target computer system 206 and a communication means through which the ransomware server 202 communicates therewith, such as a computer network. The ransomware identifier 216 actively exposes the target computer system 206 to the ransomware algorithm 204. The data 208 stored by target computer system 206 is a predetermined data set such that it can be reconstituted, replicated and reused. In some embodiments, the data 208 includes data that may be actively indexed by ransomware such as data of value to a malicious entity including, inter alia: personal sensitive information such as names, addresses, contact information; financial information such as bank account information, credit card details, debit card details, online banking credentials and the like; payment information; data marked confidential; data marked secret; a private encryption key; a digital signature; username information; password, passphrase, personal identification number, or other access control credentials; and other data as will be apparent to those skilled in the art.

During exposure of the target computer system 206 to the ransomware 204 the data 208 becomes encrypted by the ransomware 204 using the searchable encryption algorithm 210, including the generation of the encryption index 212. The ransomware identifier 216 intercepts the index 212 which can be provided in plaintext form. Subsequently, the ransomware identifier trains an autoencoder 218 based on the index such that the autoencoder 218 is trained to recognize the particular ransomware 204 based on the index 212 generated by the ransomware 204 for data 208. Notably, different ransomware algorithms will cause the generation of different indices for a number of reasons including: a different emphasis or preference of different ransomware algorithms for different types of data stored in the data set 208, for example, some ransomwares will seek to index all personal data while others might focus only on credit card numbers and the like; and the different searchable encryption algorithms employed by different ransomwares will result in different indexes.

Thus, the autoencoder 218 can be trained using index data to recognize indices generated by ransomware 204. One arrangement for generating input data for training (or, indeed, testing) the autoencoder 218 is outlined below.

The index 212 will generally consist of a series of locations within the encrypted form of data 208, each location identifying a particular data item or type of data of interest. Such locations will therefore occur across a range of locations from a lowest location (or offset) in the encrypted data to a highest location (or offset) in the data. In one embodiment, such an index is converted to a suitable input vector for the autoencoder 218 as follows:

1. Normalize each index location in the range [0 . . . 1]. Such normalization can be achieved by:

$$\frac{\text{index location} - \text{lowest location}}{\text{highest location} - \text{lowest location}}$$

where: index location is the location (or offset) of a current index entry being processed; lowest location is the lowest location (or offset) in the index; and highest location is the highest location (or offset) indicated in the index.

2. All normalized index entries are discretized by association with slots in a range [0 . . . 1] with the slot size (width) being determined by:

$$\frac{1}{\text{highest location} - \text{lowest location}}$$

Thus, if locations range from 50 to 150 then the slot size is $$\frac{1}{150 - 50} = \frac{1}{100}$$

and thus slots will occur at [0, 0.01, 0.02, 0.03 . . . ].

3. Map each normalized index entries to a slot in the discretized range of slots. Locating an appropriate slot can use any suitable and consistent approach such as: rounding down to the nearest slot; or rounding up to the nearest slot; or truncating etc.

4. A count of entries for each slot can now be generated, and once counted, each slot assumes a normalized value depending on the lowest and highest counts for all slots. Thus, each slot ultimately has a normalized value in the range [0 . . . 1].

5. The normalized slot values are used to constitute an input vector for training the autoencoder.

Once trained, the autoencoder 218 can be further used to determine if a subsequent ransomware matches the one used to train the autoencoder. Thus, responsive to a subsequent ransomware attack using an unknown ransomware, the ransomware identifier 216 exposes a computer system having the predetermined set of sample data to the unknown ransomware to effect encryption of the data by a searchable encryption algorithm of the unknown ransomware. Subsequently, an index generated by the unknown ransomware can be intercepted and used to generate an input vector for the trained autoencoder 218 using the steps outlined above. The input vector so processed is then fed into the autoencoder 218 to determine if the autoencoder 218 is able to recognize the input vector as indicative that the index generated by the unknown ransomware is indicative of the unknown ransomware being the same as the ransomware 204 used to train the autoencoder 218. Thus, in this way appropriate responsive actions 214 associated with a ransomware 204 can be selected for the unknown ransomware as appropriate.

In one embodiment, the autoencoder 218 is trained using multiple training examples based on indices generated from repeated exposures of the target computer system 206 to the ransomware 204. Further, in a preferred embodiment, the autoencoder 218 is trained using multiple training examples based on indices from a plurality of different ransomware algorithms to which the target computer system 206 is exposed to discriminate ransomware algorithms.

Figure 3:
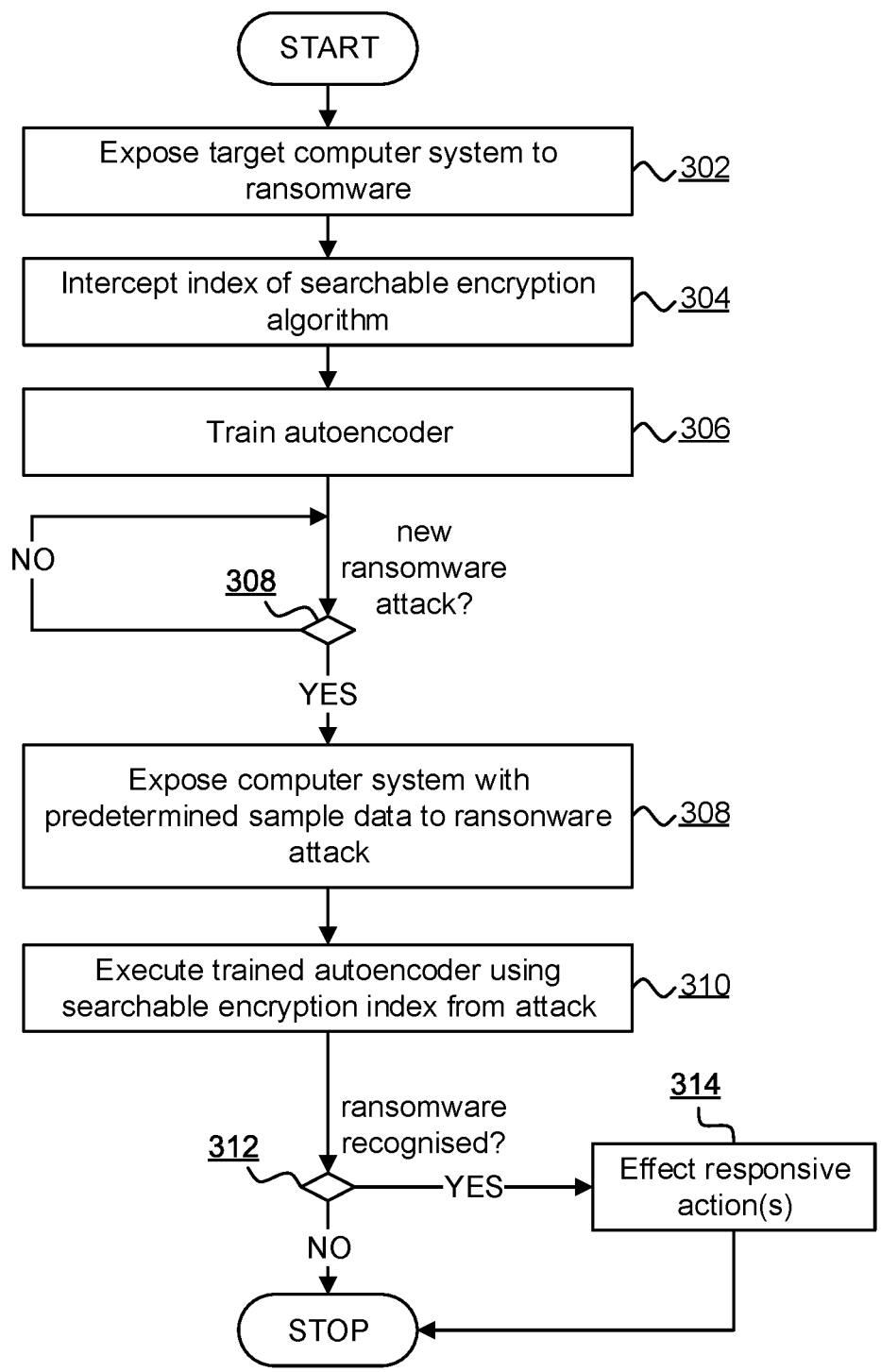
FIG. 3 is a flowchart of a method of identifying a ransomware algorithm according to embodiments of the present disclosure.

FIG. 3 is a flowchart of a method of identifying a ransomware algorithm according to embodiments of the present disclosure. Initially, at 302, the method exposes the target computer system 206 to the ransomware 204. At 304 a searchable encryption index 212 is intercepted and used to generate training input vector(s) to train the autoencoder 218 at 306. At 308 the method determines if a new ransomware attack is detected, and if so, 308 exposes a computer system with the predetermined sample data to the ransomware in the attack. At 310 the method executes the trained autoencoder 218 using an input vector generated from a searchable index of the ransomware used in the attack. At 312 the method determines if the ransomware is recognized by the autoencoder 218 and, if recognized, the method selects and effects responsive actions associated with the recognized ransomware at 314.

Figure 4:
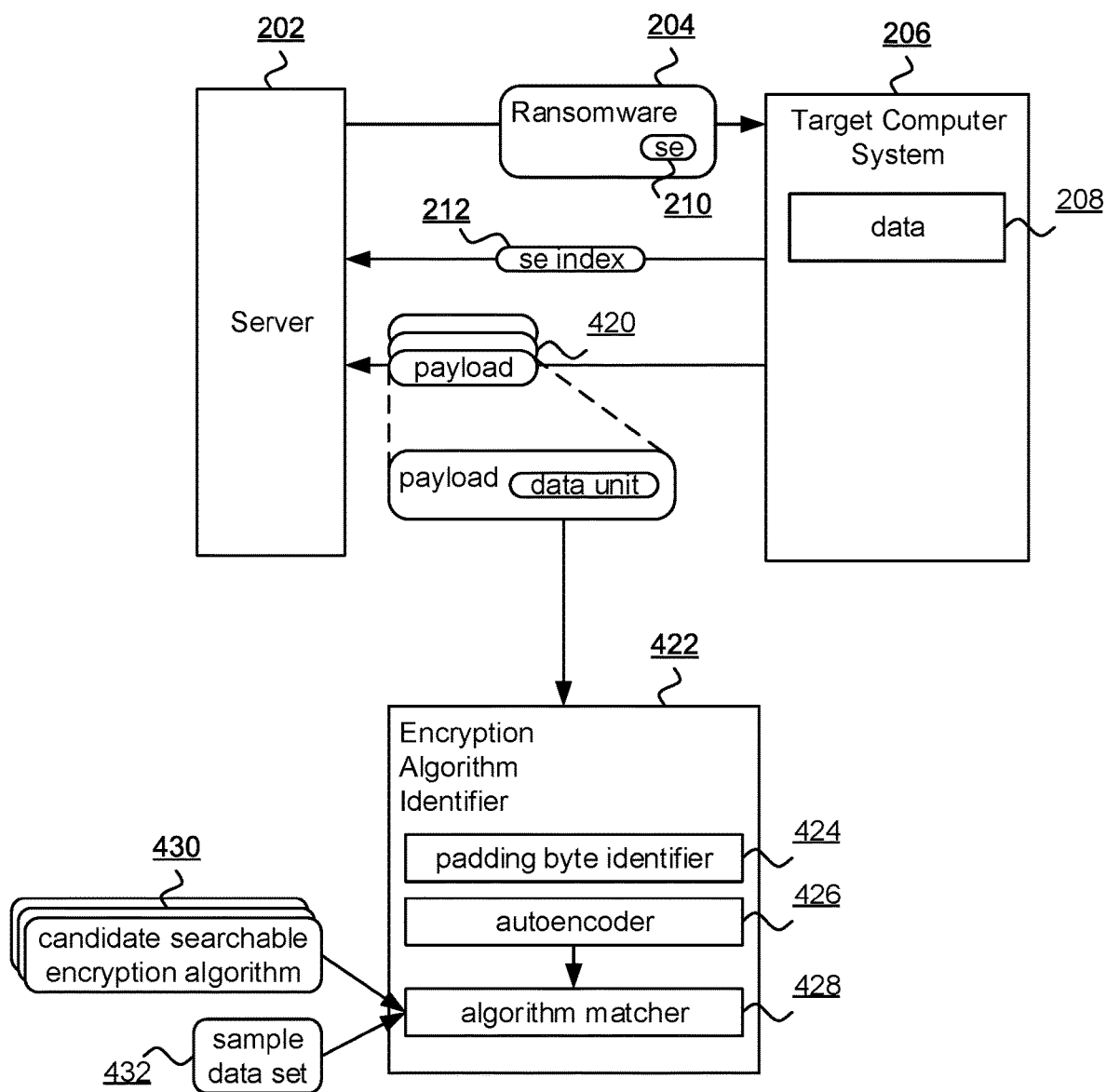
FIG. 4 is a component diagram of an arrangement including an encryption algorithm identifier according to embodiments of the present disclosure.

FIG. 4 is a component diagram of an arrangement including an encryption algorithm identifier 422 according to embodiments of the present disclosure. Many of the features of FIG. 4 are identical to those described above with respect to FIG. 2 and these will not be repeated here. The encryption algorithm identifier 422 of FIG. 4 is a software, hardware, firmware or combination component arranged to determine which one of a set of candidate searchable encryption algorithms 430 is used by the ransomware 204 to encrypt the data 208. This is achieved by the encryption algorithm identifier 422 intercepting an ordered plurality of messages 420 communicated from the target computer system 206 to the ransomware server 202. Such messages are responses by the ransomware acting on the target computer system 206 to requests made by the server 202 for encrypted data from the data store 208 at locations in the index 212. For example, where the server 202 requests to receive encrypted credit card information stored in the data store 208, the location of such credit card information is determined by the server 202 in the index 212 and data at that location is requested from the target computer system 206. The messages 420 constitute responses to such requests and are ordered temporally according to the requests.

Each message 420 includes a message payload storing an encrypted unit of data (data unit) from the target computer system. Different encryption algorithms can operate on blocks (or units) of data of different sizes. For example, 64 byte blocks, 128 byte blocks, 256 byte blocks and other encryption block sizes as will be apparent to those skilled in the art. Accordingly, the data unit in the payload of messages 420 will be an integral multiple of blocks (units) of encryption for an encryption algorithm employed by the ransomware 204. Where the actual data requested by the server does not constitute such an integral multiple of encryption blocks, then the data unit in the message payload will be padded using padding characters (bytes). These padding characters may vary within the same encryption algorithm across different messages in a sequence of messages, though within one message the same character will occur. Further, across an ordered sequence of messages, commonality can occur—such as commonality of the sequence of padding characters employed.

The encryption algorithm identifier 422 uses these padding characters to characterize an encryption algorithm by training an autoencoder 426 (notably, a different autoencoder to that described with respect to FIGS. 2 and 3). Initially, a padding byte identifier 424 identifies a padding byte for a message payload as a last byte in the data unit of the payload. The last byte is used because, where padding takes place, padding is at the end of the data unit. The autoencoder 426 is then trained based on the padding byte used by the encryption algorithm of the ransomware. The autoencoder 426 is trained using multiple training vectors arising from the padding bytes identified in each of an ordered sequence of message payload data units. In this way, the autoencoder 426 encodes the characteristics of the padding bytes and the order of padding bytes across multiple messages.

The nature of the training vector will now be described according to an exemplary embodiment. The padding byte extracted as the last byte can be assumed to be taken from a subset of all byte values. In some embodiments, all possible values of a character set may be employed, or all values of a byte (0 to 255). By way of example, the 62 byte values [a . . . z], [A . . . Z] and [0 . . . 9] are considered. The byte value for a padding byte of a particular message in the ordered sequence of messages is combined with the position in the ordered sequence to constitute an input vector. Thus, the autoencoder 426 in the exemplary embodiment has input units for each possible byte value for each possible sequence value. In a preferred embodiment, the autoencoder 426 is a restricted Boltzmann machine having hidden units according to a number of messages in the ordered sequence of messages, such that each hidden unit corresponds to a position in the ordered sequence.

Thus, when trained, the autoencoder 426 is adapted to differentiate encryption algorithms used by ransomwares. The identification of a particular encryption algorithm from the set of candidate algorithms 430 can also be achieved using an algorithm matcher 428. The operation of the algorithm matcher 428 is outlined below.

The sample data set 432 (corresponding to the data set 208 stored at the target computer system) is encrypted by each algorithm in the set of candidate searchable algorithms 430, each algorithm also generating a searchable encryption index. Each version of the encrypted sample data set is then used to request and receive an ordered plurality of elements of the encrypted data set using locations indicated in a corresponding index. A final byte of each element is then used, along with a position in the ordered set of the element, to constitute an input vector for the trained autoencoder 426. The trained autoencoder 426 is then invoked with the input vector to determine if the autoencoder 426 recognizes the candidate searchable encryption algorithm. In this way, a particular encryption algorithm from the candidate set can be associated with the autoencoder 426 trained for a particular ransomware 204, so identifying the searchable encryption algorithm for the ransomware.

Figure 5:
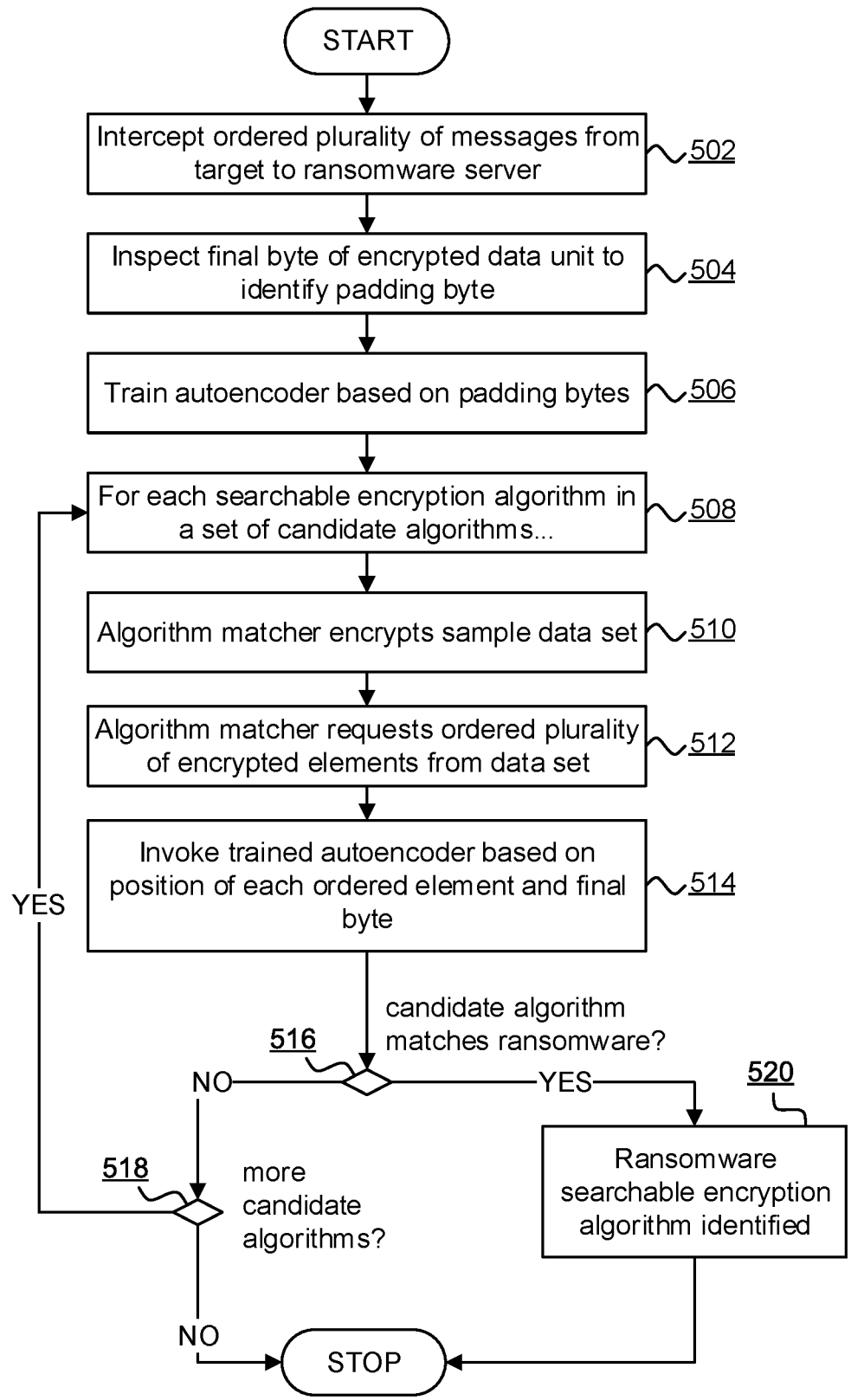
FIG. 5 is a flowchart of a method of identifying an encryption algorithm used by a ransomware algorithm according to embodiments of the present disclosure.

FIG. 5 is a flowchart of a method of identifying an encryption algorithm used by a ransomware algorithm according to embodiments of the present disclosure. Initially, at 502, the method intercepts messages in an ordered plurality of messages 420 from the target computer system 206 to the server 202. At 504 the method inspects a final byte of an encrypted data unit in a message payload to identify a padding byte. At 506 the autoencoder 426 is trained based on the padding bytes and the position of each message in the ordered plurality of messages. At 508, for each searchable encryption algorithm in the candidate set of algorithms 430, the method performs 510 to 518. At 510 the algorithm matcher 428 encrypts the sample data set 432 using a current candidate algorithm. At 512 the algorithm matcher 428 requests an ordered plurality of encrypted elements from the data set 432. At 514 the algorithm matcher 428 invokes the trained autoencoder 426 based on the final (padding) byte of each element and the position of each element in the ordered plurality to determine, at 516, if the autoencoder 426 recognizes the candidate encryption algorithm. Where there is recognition, the candidate encryption algorithm is associated with the ransomware 204 at 520. Otherwise, the flowchart repeats for all candidate algorithms 430 at 518.

An encryption algorithm used by a ransomware will require the generation of an encryption key. Ransomware servers may not manage keys for all infected target computer systems because such management is resource intensive and introduces a vulnerability of key storage. Accordingly, a ransomware will utilize immutable characteristics of a target computer system to generate a key at the time of ransomware infection in order that the same key can be reliably generated by a ransomware server in respect of the same target computer system subsequently. The key will, thus, be generated based on seed data or parameters arising from the target computer system that cannot be expected to change. i.e. data relating to hardware features of the target computer system such as one or more of any or all of, inter alia: a central processing unit; a memory; a storage device; a peripheral device; a basic input/output subsystem; an output device; an input device; a network device; and other hardware as will be apparent to those skilled in the art. Data about such hardware components can include, inter alia: a reference number; an identifier; a version; a date; a time; an address; a serial number; and/or any unique information about one or more hardware components as will be apparent to those skilled in the art.

Figure 6:
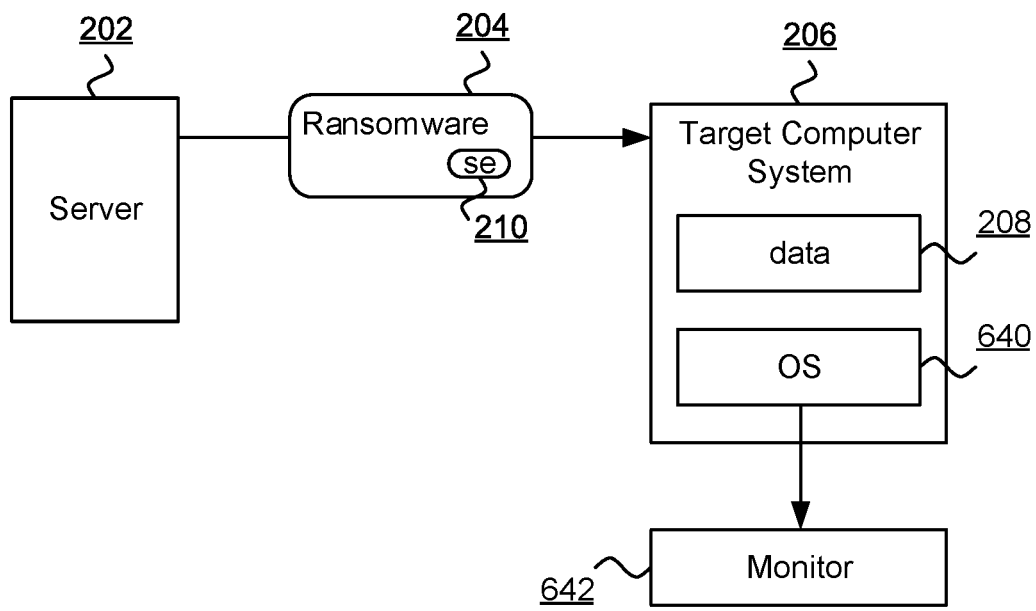
FIG. 6 is a component diagram of an arrangement including a monitor for determining a plurality of data sources providing seed parameters of an encryption algorithm according to embodiments of the present disclosure.

FIG. 6 is a component diagram of an arrangement including a monitor 642 for determining a plurality of data sources providing seed parameters of an encryption algorithm according to embodiments of the present disclosure. Many of the features of FIG. 6 are the same as those described above with respect to FIG. 2 and these will not be repeated here. On infection by a ransomware 204, the target computer system 206 will be used to generate an encryption key. To access data about hardware components, devices, features and the like calls will be made to or via an operating system (OS) 640 of the target computer system. Embodiments of the present invention provide a monitor 642 for monitoring application programming interface (API) calls made to the operating system 640 to identify a set of one or more calls for retrieving data about one or more hardware components of the target computer system 206. The data about such components is then determined to constitute the seed parameters for the generation of an encryption key by the ransomware 204.

In some embodiments, the timing of the monitoring by the monitor 642 is selected to coincide with a period when generation of the encryption key can be expected. Thus, the target computer system 206 is exposed to the ransomware 204 intentionally and, at the point of initial exposure and before encryption commences, monitoring of the API calls is performed. The commencement of encryption can be detected by a sudden increase in storage activity—such as disk input/output activity—arising from the process of reading, encrypting and writing data 208 to storage device(s).

In one embodiment, the monitor 642 uses a process monitor to identify API calls, such process monitors being commonly available as part of, or to supplement, operating systems of computer systems.

Figure 7:
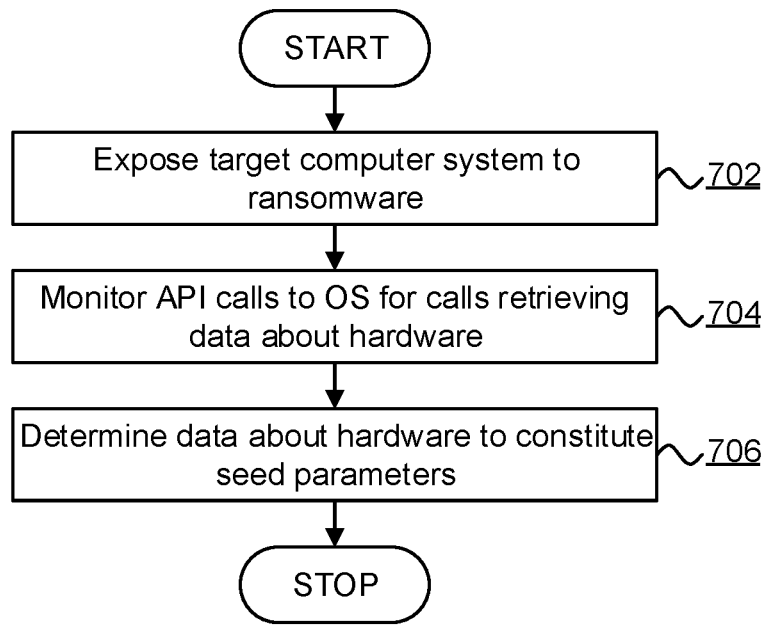
FIG. 7 is a flowchart of a method for determining a plurality of data sources providing seed parameters of an encryption algorithm according to embodiments of the present disclosure.

FIG. 7 is a flowchart of a method for determining a plurality of data sources providing seed parameters of an encryption algorithm according to embodiments of the present disclosure. At 702 the method exposes the target computer system 206 to the ransomware 204. At 704 the monitor 642 monitors API calls to or via the operating system 40 to identify calls retrieving (or possibly useful for retrieving) data about hardware components of the target computer system. At 706 the method determines data about hardware retrieved via the API calls detected at 704 to constitute seed parameters for the generation of an encryption key for the ransomware 204.

Previously described embodiments serve to identify ransomware, determine a searchable encryption algorithm used by the ransomware and determine seed information for the generation of an encryption key for the ransomware. The combination of these techniques can be further applied to remediate a ransomware infection by decrypting a data store encrypted by a ransomware.

Figure 8:
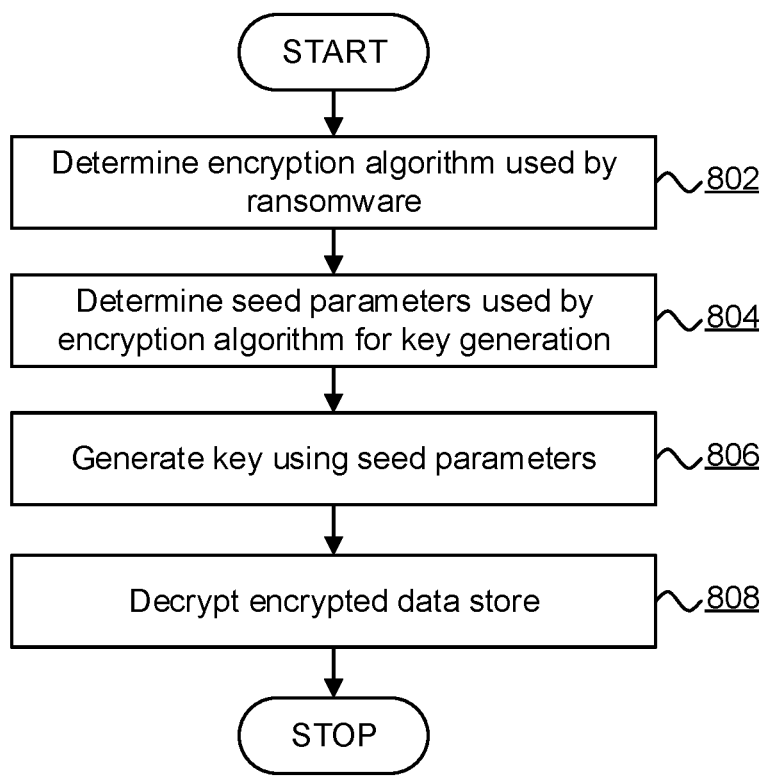
FIG. 8 is a flowchart of a method for decrypting an encrypted data store at a target computer system encrypted by a ransomware algorithm in accordance with embodiments of the present disclosure.

FIG. 8 is a flowchart of a method for decrypting an encrypted data store at a target computer system encrypted by a ransomware algorithm in accordance with embodiments of the present disclosure. At 802 a searchable encryption algorithm used by the ransomware is determined. For example, the techniques described above with respect to FIGS. 4 and 5 can be employed. At 804, seed parameters used by the encryption algorithm for key generation are determined. For example, the techniques described above with respect to FIGS. 6 and 7 can be employed. The particular order of seed parameters used in the key generation process can be determined by trial and error using, for example, software. Furthermore, the key generation algorithm required can be determined based on the identified encryption algorithm from 802. Subsequently, at 806, an encryption key for the ransomware infection is generated using the seed information determined at 804 and the encryption algorithm determined at 802. Finally, at 808, data encrypted by a ransomware is decrypted using the encryption algorithm determined at 802 and the key generated at 808.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure. It will be understood by those skilled in the art that, although the present disclosure has been described in relation to the above described example embodiments, the invention is not limited thereto and that there are many possible variations and modifications which fall within the scope of the invention. The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method for decrypting an encrypted data store at a target computer system, the encrypted data store being encrypted by a ransomware algorithm using a searchable encryption algorithm, the method comprising:
   determining an encryption algorithm used by the ransomware algorithm;
   determining seed parameters used by the encryption algorithm to generate an encryption key;
   generating the encryption key using the seed parameters; and
   decrypting the encrypted data store,
   wherein the encryption algorithm is determined by training an autoencoder based on padding bytes used by the encryption algorithm to pad units of data encrypted by the ransomware algorithm, and using the trained autoencoder to process padding bytes for units of data encrypted by each of a plurality of known searchable encryption algorithms to identify one of the known searchable encryption algorithms as the encryption algorithm used by the ransomware, and
   wherein the seed parameters are determined based on monitoring application programming interface (API) calls made to an operating system of a computer system targeted by the ransomware algorithm to identify a set of API calls for retrieving data about one or more hardware components of the target computer system, the data about the one or more hardware components being determined to constitute the seed parameters.

2. The method of claim 1, wherein the autoencoder is trained by:
   exposing a training computer system to the ransomware algorithm to encrypt a data store of the training computer system using the searchable encryption algorithm;
   intercepting an ordered plurality of messages communicated from the training computer system to a ransomware server computer system, each message in the ordered plurality of messages including a payload storing an encrypted unit of data from the target computer system;
   inspecting a final byte in the encrypted unit of data in each message in the ordered plurality of messages to identify a byte value used by the encryption algorithm of the ransomware algorithm as the padding byte to pad messages to a size of an integral multiple of units of encryption for the encryption algorithm; and
   training an autoencoder based on a position of a message in the ordered plurality of messages and the padding byte to provide a trained autoencoder adapted to differentiate the encryption algorithm used by the ransomware algorithm from other different encryption algorithms.

3. The method of claim 2, wherein using the trained autoencoder to process padding bytes for units of data encrypted by each of a plurality of known searchable encryption algorithms comprises:
for each of the set of known searchable encryption algorithms:
encrypting a sample data set;
requesting and receiving an ordered plurality of elements of the encrypted data set using locations indicated in an index generated by the known searchable encryption algorithm;
inspecting a final byte of each element of the ordered plurality of elements; and
invoking the trained autoencoder based on a position of each element in the ordered plurality of elements and a final byte corresponding to each element of the ordered plurality of elements so as to determine if the known searchable encryption algorithm matches the encryption algorithm used by the ransomware algorithm.

4. The method of claim 1, wherein each hardware component includes one or more of: a central processing unit; a memory; a storage device; a peripheral device; a basic input/output subsystem; an output device; an input device; or a network device of the target computer system.

5. The method of claim 1, wherein data about a hardware component includes one or more of: a reference number; an identifier; a version; a date; a time; an address; a serial number; or unique information about the hardware device.

6. The method of claim 1, wherein monitoring includes using a process monitor to determine if operating system API calls are made.

7. A non-transitory computer-readable storage medium storing a computer program element comprising computer program code to, when loaded into a computer system and executed thereon, cause the computer system to perform the method as claimed in claim 1.

8. A computer system comprising:
a processor and memory storing computer program code for decrypting an encrypted data store at a target computer system, the encrypted data store being encrypted by a ransomware algorithm using a searchable encryption algorithm, by:
determining an encryption algorithm used by the ransomware algorithm;
determining seed parameters used by the encryption algorithm to generate an encryption key;
generating the encryption key using the seed parameters; and
decrypting the encrypted data store,
wherein the encryption algorithm is determined by training an autoencoder based on padding bytes used by the encryption algorithm to pad units of data encrypted by the ransomware algorithm, and using the trained autoencoder to process padding bytes for units of data encrypted by each of a plurality of known searchable encryption algorithms to identify one of the known searchable encryption algorithms as the encryption algorithm used by the ransomware, and
wherein the seed parameters are determined based on monitoring application programming interface (API) calls made to an operating system of a computer system targeted by the ransomware algorithm to identify a set of API calls for retrieving data about one or more hardware components of the target computer system, the data about the one or more hardware components being determined to constitute the seed parameters.

* * * * *